(12) United States Patent
Dollar, Jr. et al.

(10) Patent No.: US 8,745,574 B2
(45) Date of Patent: Jun. 3, 2014

(54) GENERATING TASK DURATION ESTIMATES FOR CONTENT INGESTION

(75) Inventors: William A. Dollar, Jr., Seattle, WA (US); Ross David Heeter, Seattle, WA (US); Stefan Keir Gordon, Redmond, WA (US); Robert Bryce Johnson, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 234 days.

(21) Appl. No.: 13/314,208

(22) Filed: Dec. 8, 2011

(65) Prior Publication Data
US 2013/0152040 A1  Jun. 13, 2013

(51) Int. Cl.
*G06F 9/44* (2006.01)

(52) U.S. Cl.
USPC ............ 717/102; 717/101; 717/103; 717/120

(58) Field of Classification Search
None
See application file for complete search history.

(56) References Cited

U.S. PATENT DOCUMENTS

| | | | |
|---|---|---|---|
| 4,893,256 A * | 1/1990 | Rutherfoord et al. ......... 345/473 |
| 6,829,587 B2 | 12/2004 | Stone et al. |
| 6,910,049 B2 * | 6/2005 | Fenton et al. ......................... 1/1 |
| 7,467,198 B2 | 12/2008 | Goodman et al. |
| 7,502,997 B2 * | 3/2009 | Reid et al. ..................... 715/243 |
| 7,660,734 B1 | 2/2010 | Neal et al. |
| 8,015,491 B2 * | 9/2011 | Shaver et al. ................. 715/719 |
| 8,522,006 B2 * | 8/2013 | Kido et al. ..................... 713/150 |
| 2002/0146232 A1 * | 10/2002 | Harradine et al. .............. 386/46 |
| 2002/0194194 A1 * | 12/2002 | Fenton et al. ............... 707/104.1 |
| 2003/0191678 A1 * | 10/2003 | Shetty et al. ....................... 705/8 |
| 2005/0034098 A1 | 2/2005 | DeSchryver et al. |
| 2006/0224943 A1 * | 10/2006 | Snyder et al. ............... 715/501.1 |
| 2011/0225417 A1 * | 9/2011 | Maharajh et al. ............. 713/150 |
| 2012/0159503 A1 * | 6/2012 | Shafiee et al. ................. 718/104 |

OTHER PUBLICATIONS

"Intranet", Retrieved at <<https://feem-projectnet.serversicuro.it/exiopol/intranet_manual.pdf>>, Oct. 28, 2007, pp. 12.
Zhu, et al., "IBM FileNet P8 Platform and Architecture", Retrieved at <<http://www.redbooks.ibm.com/redbooks/pdfs/sg247667.pdf>>, Apr. 2011, pp. 411.
"IBM Tivoli Release Process Manager", Retrieved at <<http://www-01.ibm.com/software/tivoli/products/release-process-mgr/features.html>>, Retrieved Date: Sep. 28, 2011, pp. 2.

* cited by examiner

*Primary Examiner* — Isaac Tecklu
(74) *Attorney, Agent, or Firm* — Bryan Webster; Andrew Sanders; Micky Minhas (57) ABSTRACT

Embodiments establish duration estimates for tasks associated with media content ingestion, such as in application or game production. A content ingestion system receives a content submission request from a publisher. The request identifies a media content type that has a plurality of associated tasks. Based on previous submissions from the publisher, duration estimates for the tasks are generated and adjusted based on historical transaction data associated with other publishers (e.g., global averages). The duration estimates are provided to the publishers along with, for example, start and end dates for the tasks presented on a calendar or other workback schedule.

19 Claims, 10 Drawing Sheets

| < MARCH 2011 | | | APRIL 2011 | | | MAY 2011 > |
|---|---|---|---|---|---|---|
| MONDAY | TUESDAY | WEDNESDAY | THURSDAY | FRIDAY | SATURDAY | SUNDAY |
| 28 | 29 | 30 | 31 CONCEPT SUBMISSION & APPROVAL [[STATUS]]: 03/31/2011-04/03/2011 | 1 | 2 | 3 |
| 4 CATALOG SUBMISSION & APPROVAL [[STATUS]]: 04/02/2011-04/07/2011 | 5 | 6 SKU DEFINITION SUBMISSION & APPROVAL [[STATUS]]: 04/06/2011-04/12/2011 | 7 | 8 | 9 | 10 CATALOG SUBMISSION & [[STATUS]]: 04/02/2011- |
| 11 SKU DEFINITION SUBMISSION & APPROVAL [[STATUS]]: 04/06/2011- CONTENT SUBMISSION AND APPROVAL [[STATUS]]: 04/08/2011-04/14/2011 | 12 | 13 GAME CONFIGURATION PROP [[STATUS]]: 04/13/2011-04/21/2011 | 14 | 15 CONTENT SUBMISSION AND APPROVAL [[STATUS]]: 04/08/2011-04/14/2011 | 16 | 17 |
| 18 GAME CONFIGURATION PROP [[STATUS]]: 04/13/2011-04/21/2011 | 19 | 20 | 21 | 22 TEST DISC VALIDATION [[STATUS]]: 04/22/2011-04/24/2011 | 23 | 24 |
| 25 NETWORK VERIFICATION [[STATUS]]: 04/25/2011-04/27/2011 | 26 | 27 | 28 RETAIL DISC MANUFACTURING [[STATUS]]: 04/28/2011- | 29 | 30 | 1 ANTICIPATED STREET DATE 04/29/2011 (CATALOG LISTING) |

GENERATING TASK DURATION ESTIMATES FOR CONTENT INGESTION

BACKGROUND

Software development lifecycles for the production of games, applications, videos, downloadable content, and other media content are often complicated and time-sensitive with multiple tasks to complete. The tasks may be manual or automated, and some tasks are dependent on other tasks which further increases the complexity of scheduling the tasks. Additionally, the time it takes to complete each of the tasks varies by developer and per project. Delays in completing the tasks can result in slipped release dates leading to reduced sales and lost productivity.

SUMMARY

Embodiments of the disclosure produce a schedule for media content ingestion. A content ingestion system receives a content submission request from a publisher. The content submission request identifies a media content type. The media content type has a plurality of tasks associated therewith. The content ingestion system generates, based on previous content submissions from the publisher, a duration estimate for each of the plurality of tasks associated with the media content type in the received content submission request. The generated duration estimates are adjusted for each of the plurality of tasks based on historical transaction data associated with a plurality of publishers. The adjusted duration estimates for each of the plurality of tasks are provided to the publisher.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable the generation of a schedule for content ingestion. In some embodiments, duration estimates for tasks involved in processing content are generated and provided to publishers 104. Start and end dates for the tasks may be identified and presented on a calendar (e.g., as a Gantt chart) or other workback schedule. The calendar or schedule is visible to the publisher 104 and helps the publisher 104 to manage the submission of content to a content ingestion system 102. In some embodiments, the duration estimates are used to establish achievable service level agreements (SLAs).

Figure 1:
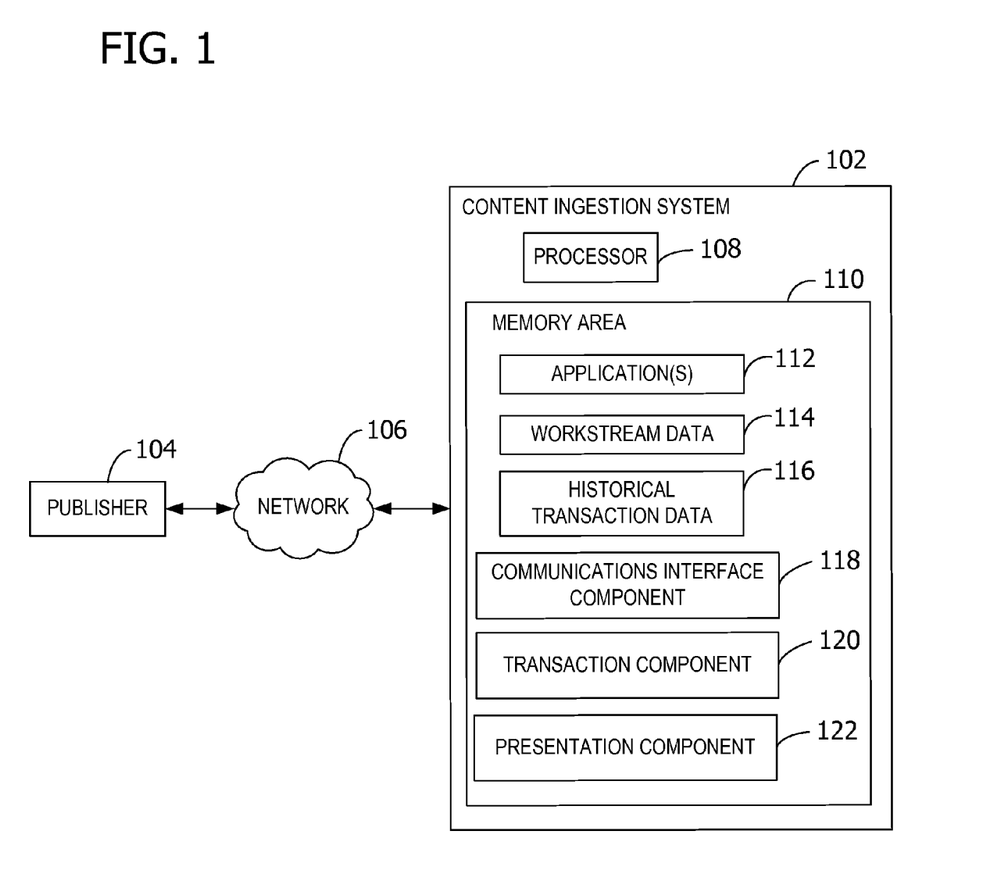
FIG. 1 is an exemplary block diagram illustrating a content ingestion system receiving content from publishers.

Referring next to FIG. 1, an exemplary block diagram illustrates the content ingestion system 102 receiving content from the publishers 104. The content ingestion system 102 represents any system for receiving content or other data from another entity such as the publisher 104 or submitter. Exemplary content may be defined by media content type including applications, games, audio, video, images, and/or documents for execution or rendering on one or more computing devices such as user computing devices. For example, the media content types may identify content as a mobile device application, a downloadable game, a disc game, a portable media player video or audio clip, a game or movie trailer, and the like.

Exemplary computing devices include user computing devices such as mobile telephones, tablets, gaming consoles, and any other devices or appliances. Exemplary publishers 104 include content developers such as software developers (e.g., individuals or corporations), media producers, and the like. Each of the publishers 104 includes any quantity of computing or processing devices implementing functionality for providing content from the publishers 104 to the content ingestion system 102.

In some embodiments, the content ingestion system 102 represents a market, marketplace, or store that receives content from the publishers 104 and makes the content accessible to the user computing devices. In other embodiments, the content ingestion system 102 represents a producer and/or distributor. The content ingestion system 102 receives the content from the publishers 104 via a network 106 such as the Internet, although aspects of the disclosure are operable with any form of network.

In the example of FIG. 1, the content ingestion system 102 is a computing device that produces a task-based schedule for ingesting or otherwise processing the content received from the publishers 104. The computing device represents any device executing instructions (e.g., as application programs, operating system functionality, or both) to implement the operations and functionality associated with the content ingestion system 102. The computing device may include any portable or non-portable device including a mobile telephone, laptop, tablet, computing pad, netbook, gaming device, portable media player, desktop personal computer, kiosk, and/or tabletop device. Additionally, the computing device may represent a group of processing units or other computing devices, such as in a cloud computing system or service.

The computing device has at least one processor 108 and a memory area 110. The processor 108 includes any quantity of processing units, and is programmed to execute computer-executable instructions for implementing aspects of the disclosure. The instructions may be performed by the processor 108 or by multiple processors executing within the computing device, or performed by a processor external to the computing device. In some embodiments, the processor 108 is programmed to execute instructions such as those illustrated in the figures.

The computing device further has one or more computer readable media such as the memory area 110. The memory area 110 includes any quantity of media associated with or accessible by the computing device. The memory area 110 may be internal to the computing device (as shown in FIG. 1), external to the computing device (not shown), or both (not shown).

The memory area 110 stores, among other data, one or more applications 112. The applications 112, when executed by the processor 108, operate to perform functionality on the computing device to implement the content ingestion system 102. Exemplary applications 112 include mail application programs, web browsers, calendar application programs, address book application programs, messaging programs, media applications, location-based services, search programs, and the like. The applications 112 may communicate with counterpart applications or services such as web services accessible via the network 106. For example, the applications 112 may represent downloaded client-side applications that correspond to server-side services executing in a cloud.

The memory area 110 further stores workstream data 114 identifying a plurality of media content types each having a plurality of tasks associated therewith. The workstream data 114 may also identify dependencies among the plurality of tasks associated with one of the media content types. The workstream data 114 may also identify "gates" or other actions associated with the tasks such as user or publisher input, certification, etc. Exemplary workstream dependencies represent one or more of the following: product-to-product dependencies (e.g., from a product development lifecycle), workflow-to-workflow dependencies (e.g., task-to-task dependencies), and state dependencies (e.g., what stage the content is in). In some embodiments, the workstream data 114 is stored in a relational database and surfaced to a schedule component 204 via a system application programming interface (API) 206 (e.g., see FIG. 2). Exemplary media content types include, but are not limited to, movies, games, and applications.

Exemplary tasks include, but are not limited to, system tasks and approval and certification tasks or gates. Exemplary system tasks include, but are not limited to, processing an uploaded media file, and propagating new catalog data to a cloud service. Exemplary approval and certification tasks include, but are not limited to, human approval of submitted data, certification and testing of a game, and creation of pricing data (e.g., offers). Other exemplary tasks include content submission and approval, catalog submission and approval, SKU definition submission and approval, game configuration prop, test disc validation, network verification, and retail disc manufacturing.

The memory area 110 further stores historical transaction data 116 associated with a plurality of the publishers 104. The historical transaction data 116 includes data describing previous content submissions from one or more of the publishers 104. The historical transaction data 116 may include, for example, statistics describing the duration (e.g., averages) for each of the tasks associated with each of the media content types. In some embodiments, the historical transaction data 116 may be filtered by publisher 104 to identify the previous content submissions received from each of the publishers 104. The historical transaction data 116 may be generated by the content ingestion system 102 or a received from another source.

The memory area 110 further stores one or more computer-executable components. Exemplary components include a communications interface component 118, a transaction component 120, and a presentation component 122. Operation of the computer-executable components is described below with reference to FIG. 4.

Figure 2:
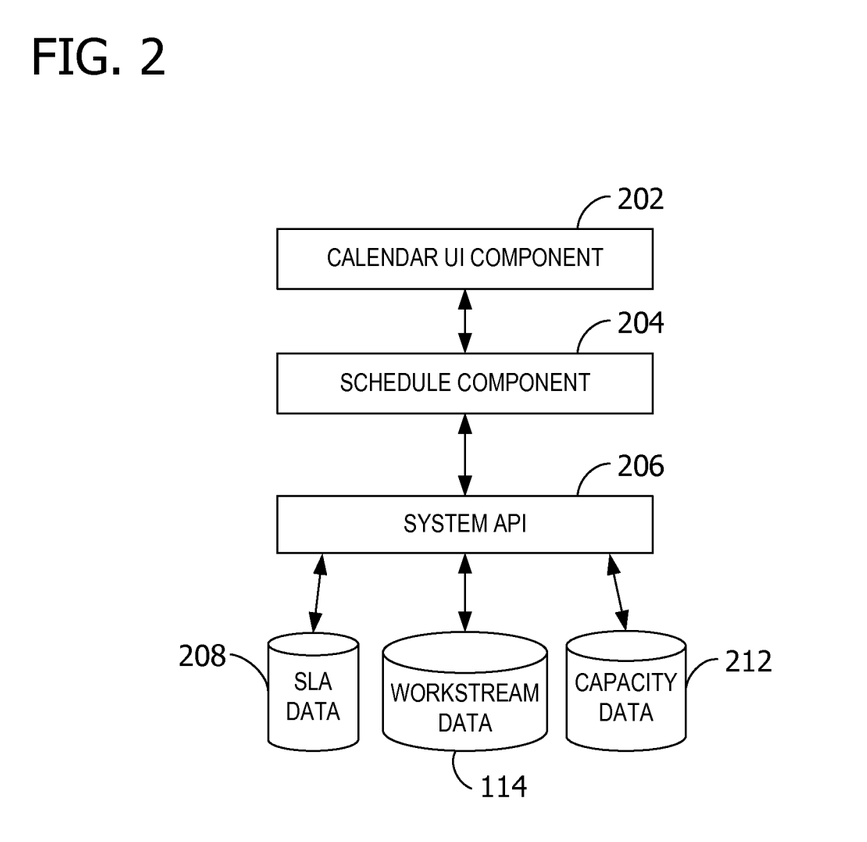
FIG. 2 is an exemplary block diagram illustrating organization of the content ingestion system.

Referring next to FIG. 2, an exemplary block diagram illustrates organization of the content ingestion system 102. In operation, the content ingestion system 102 includes a calendar user interface (UI) component 202 displaying the tasks, corresponding due dates, and/or other data on a calendar or other schedule. The calendar UI component 202 receives the data from the schedule component 204. The schedule component 204, for example, calculates the start and end dates for each of the tasks. In some embodiments, the start date for a task represents the latest possible start date for the task. The schedule component 204 communicates with the system API 206. The system API 206 obtains and provides various data items to the schedule component 204 including, but not limited to, SLA data 208, workstream data 114, and capacity data 212. The SLA data 208 defines the times for completing each of the tasks (e.g., as agreed upon contractually or otherwise). In some embodiments, the content ingestion system 102 adjusts calculated duration estimates to meet or conform to the SLA data 208. The capacity data 212 includes, for example, a scale factor representing system or personnel processing. The capacity data 212 may be defined in "slots" and may be defined regionally (e.g., per country or per continent).

Figure 3:
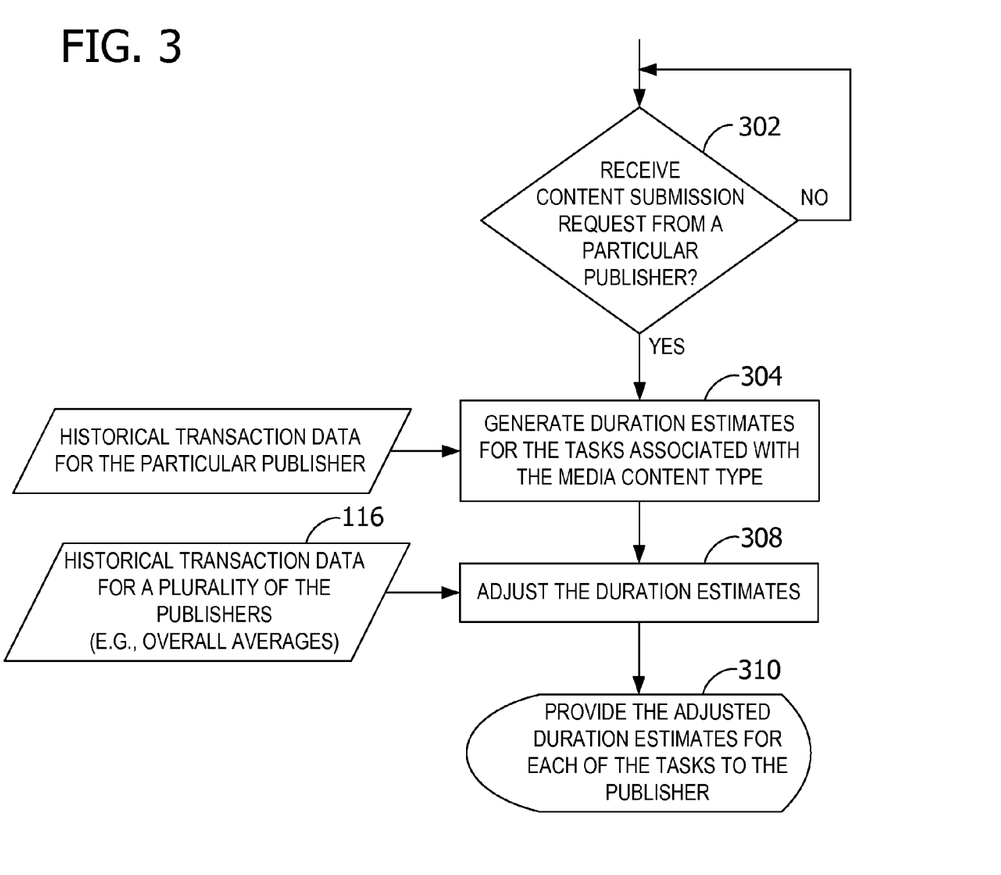
FIG. 3 is an exemplary flow chart illustrating operation of the content ingestion system to calculate duration estimates for tasks involved in ingesting content from a publisher.

Referring next to FIG. 3, an exemplary flow chart illustrates operation of the content ingestion system 102 to calculate duration estimates for tasks involved in ingesting content from the publishers 104. Content received from the publishers 104 may be processed in real-time, near real-time, or on a batch (e.g., periodic) basis. In some embodiments, the content ingestion system 102 processes content stored in a buffer or other memory area. For example, the content ingestion system 102 may receive a content submission request from one of the publishers 104. The content submission request includes the content to be ingested by the content ingestion system 102 and also identifies the media content type associated with the content. Each of the media content types has a plurality of tasks associated therewith.

If the content ingestion system 102 receives the content submission request at 302, the content ingestion system 102 generates a duration estimate for one or more of the tasks associated with the media content type of the content in the received content submission request at 304. The duration estimates are generated based on historical transaction data 116 filtered to identify previous content submission by the publisher 104 providing the content submission request. For example, the historical transaction data 116 of a plurality of the publishers 104 (e.g., all the publishers 104) is filtered or searched to produce the historical transaction data of the particular publisher 104.

At 308, the content ingestion system 102 adjusts the generated duration estimates for the tasks based on the historical transaction data 116 for a plurality of the publishers 104. For example, if the average duration across all publishers 104 for performing a similar task is 10 weeks but this particular publisher 104 has a consistent history of performing the task (or task type) 50% slower than average, aspects of the disclosure may increase the generated duration estimates to 15 weeks.

In some embodiments, the content ingestion system 102 further alters (e.g., overrides) the duration estimates based on SLAs. As an example, if there is an SLA to approve a document within five business days but the duration estimate is six business days, aspects of the disclosure alter the duration estimate to be five business days. In this example, a party may be contractually bound to adhere to the SLA and embodiments of the disclosure enable duration estimate overrides based on those contractual obligations to avoid confusion.

In other embodiments, the content ingestion system 102 calculates the duration estimates first based on the historical transaction data 116 for a plurality of the publishers 104, and then adjusts those duration estimates based on the historical transaction data for the publisher 104 that provided the content submission request. That is, operation 308 is performed before operation 304.

At 310, the content ingestion system 102 provides the adjusted duration estimates to the publisher 104 or other entity. For example, the adjusted duration estimates may be provided as a chart listing each of the tasks associated with the media content type of the content in the content submission request and the duration estimate associated with each of the tasks. As another example, the content ingestion system 102 may provide a calendar or other UI illustrating the tasks and duration estimates. In still another example, the content ingestion system 102 keeps the publishers 104 informed of the progress and deadlines for the tasks by sending notifications.

The content ingestion system 102 may further update the historical transaction data 116 before, during, or after completion of each of the tasks by the publisher 104. For example, the historical transaction data 116 may be updated based on the actual duration values for each of the tasks.

In some embodiments, a target completion date is identified for the content submission request. For example, the publisher 104 may include the target completion date in the content submission request. In another example, the content ingestion system 102 identifies the earliest completion date based on the calculated duration estimates for the tasks involved in processing the content. Given the target completion date, the content ingestion system 102 generates a workback schedule or other deadline system based on the adjusted duration estimates and the identified target completion date. For example, a due date for one or more of the tasks is generated and generates a calendar showing the due dates.

Figure 4:
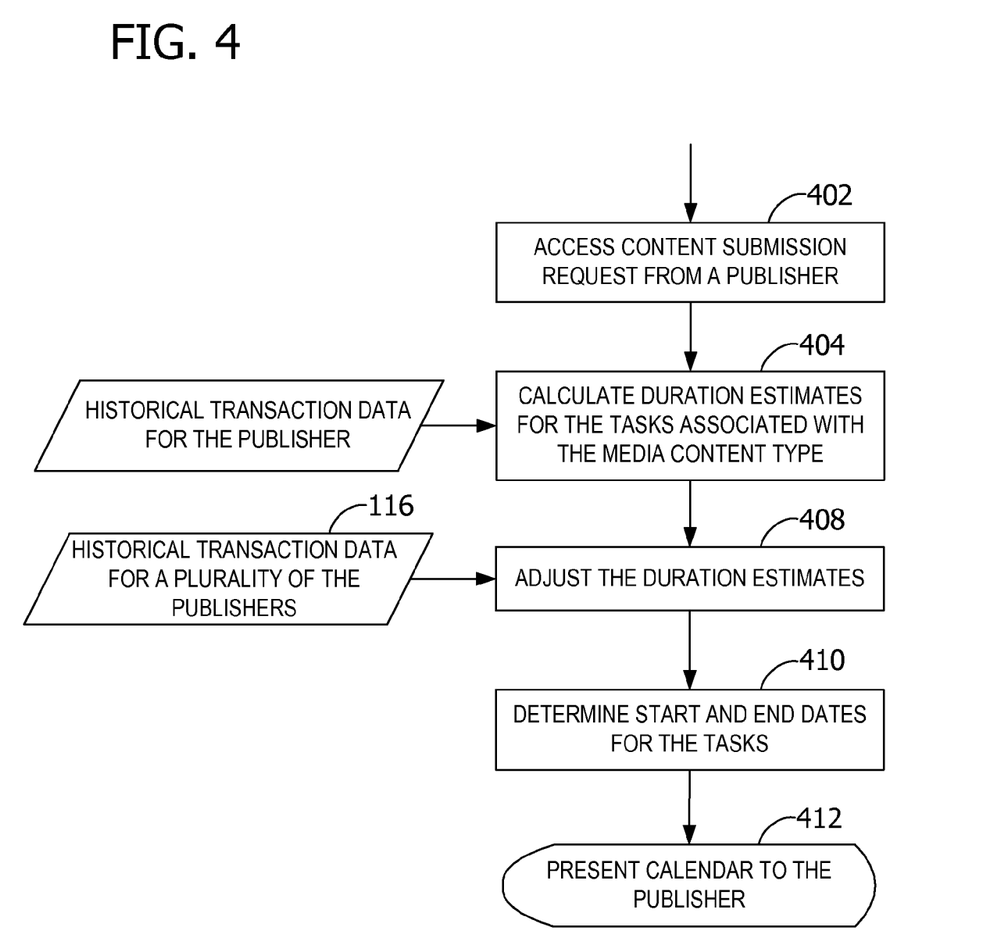
FIG. 4 is an exemplary flow chart illustrating operation of the content ingestion system to determine start and end dates for tasks involved in ingesting content from a publisher.

Referring next to FIG. 4, an exemplary flow chart illustrates operation of the content ingestion system 102 to determine start and end dates for tasks involved in ingesting content from one of the publishers 104. At 402, the content ingestion system 102 accesses a content submission request received from one of the publishers 104. The content submission request includes a target completion date. At 404, the content ingestion system 102 calculates duration estimates for the tasks associated with the received content submission request. For example, the content ingestion system 102 identifies the media content type of the content in the content submission request, and then accesses the workstream data 114 to identify the tasks associated with the media content type. For each of the tasks, the duration estimates are calculated based on the statistics for previous content submissions of the publisher 104 (e.g., filtered historical transaction data 116) that requested the content submission.

At 408, the calculated duration estimates are adjusted based on the historical transaction data 116 for one or more other publishers 104. For example, the calculated duration estimates are weighted, scaled, or otherwise adjusted based on global averages across a plurality of the publishers 104 or other group of the publishers 104.

At 410, the content ingestion system 102 determines a start date and an end date, or other milestones, for each of the tasks involved in the content submission. The start dates and the end dates are calculated based at least on the adjusted duration estimates and the target completion date. For example, the start dates and the end dates may also be calculated based on dependencies among the tasks. For example, some tasks may be performed simultaneously while other tasks are performed sequentially.

The content ingestion system 102 presents the tasks and calculated start and end dates to the publisher 104. For example, the tasks and dates may be provided in a calendar at 412. As another example, the tasks and dates may be provided in a Gantt chart overlaid on a calendar.

In some embodiments, the content ingestion system 102 compares the determined start and end dates for the tasks with, or relative to, the target completion date from the publisher 104. If the content ingestion system 102 concludes that the tasks cannot be completed by the target completion date, are unachievable by the target completion date, or are at risk or incompletion by the target completion date, the content ingestion system 102 notifies the publisher 104. For example, the content ingestion system 102 may alert the publisher 104 to an error state by color-coding tasks that cannot be completed or task completion dates that cannot be met. Different colors may indicate different severity levels for the tasks and due dates.

The operations illustrated in FIG. 4 may be performed by one or more computer-executable components such as the components illustrated in FIG. 1. For example, the communications interface component 118, when executed by the processor 108, causes the processor 108 to receive the content submission request from the publisher 104. The content submission request identifies the media content type. In some embodiments, the communications interface component 118 includes a network interface card and/or computer-executable instructions (e.g., a driver) for operating the network interface card.

The transaction component 120, when executed by the processor 108, causes the processor 108 to generate, based on previous content submissions from the publisher 104 and on historical transaction data 116 associated with a plurality of the publishers 104, a duration estimate for each of the plurality of tasks associated with the media content type. In some embodiments, the transaction component 120 further accesses the workstream data 114 to identify or define the tasks associated with the media content type.

The presentation component 122, when executed by the processor 108, causes the processor 108 to identify start and end dates on a generated calendar based on the adjusted duration estimates for each of the plurality of tasks.

Figure 5:
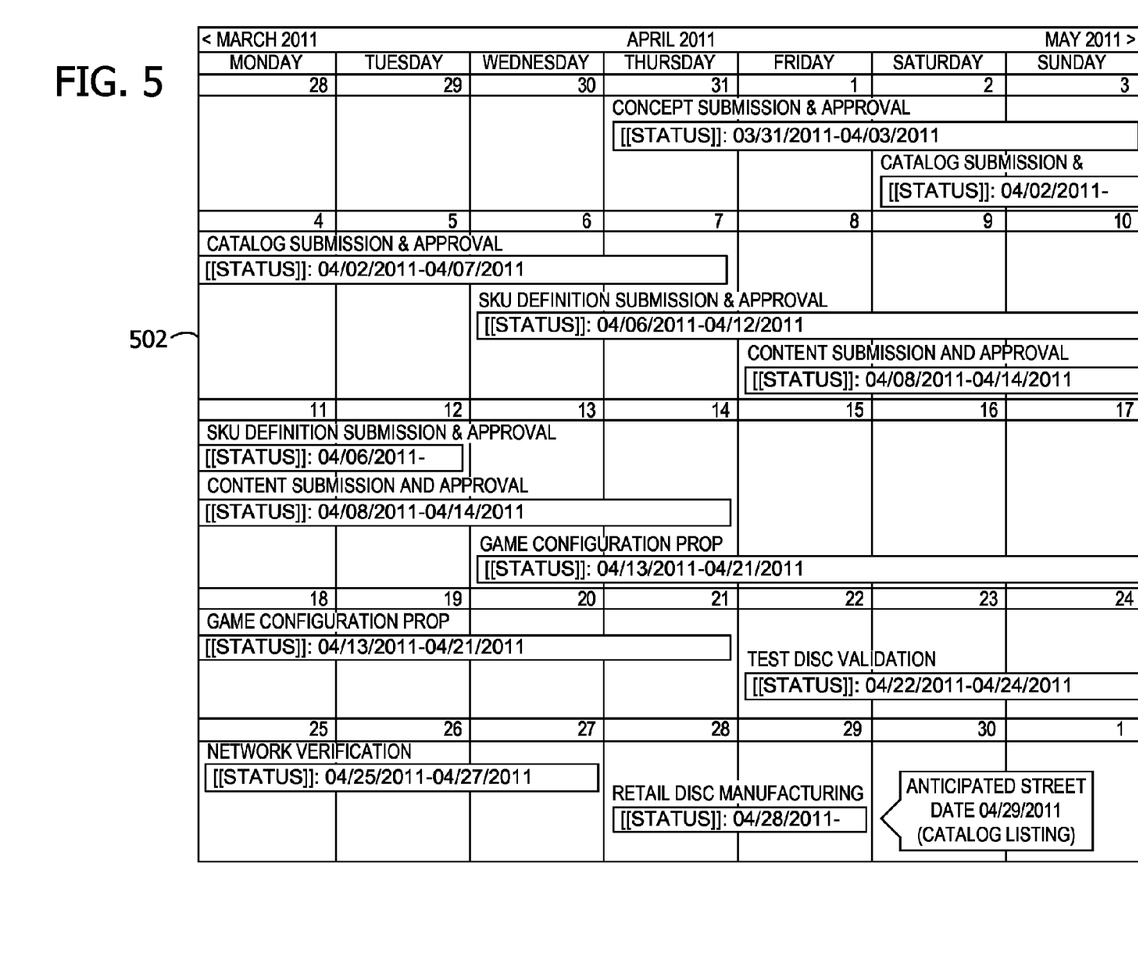
FIG. 5 is an exemplary calendar created by the content ingestion system to show tasks and corresponding start and end dates.

Referring next to FIG. 5, an exemplary calendar 502 shows tasks and corresponding start and end dates. The calendar 502 illustrated in FIG. 5 corresponds to, for example, the calendar generated by the operations illustrated in FIG. 4. The calendar 502 illustrates each of the tasks, workstreams, or workflows involved in the content submission. The start and end dates for the tasks leading up to the target completion date (e.g., anticipated street date) are also scheduled. On the anticipated street date, the content will be available within the catalog listing of content.

The calendar 502 in FIG. 5 further illustrates the dependencies, including overlap, among the tasks. For example, catalog submission and approval may overlap with concept submission and approval. However, content submission and approval occurs after completion of the catalog submission and approval.

The calendar 502 illustrated in FIG. 5 may be interactive. For example, the publisher 104 may view the calendar 502 in a user interface that enables the publisher 104 or other user to dynamically interact with the calendar elements displayed in the user interface. For example, the publisher 104 may click or otherwise select any of the tasks or durations to obtain additional information about the tasks, durations, dependencies, etc. The publisher 104 may also hover a pointing device such as a mouse or finger over the user interface elements to provoke a popup that displays the additional information.

Figure 6:
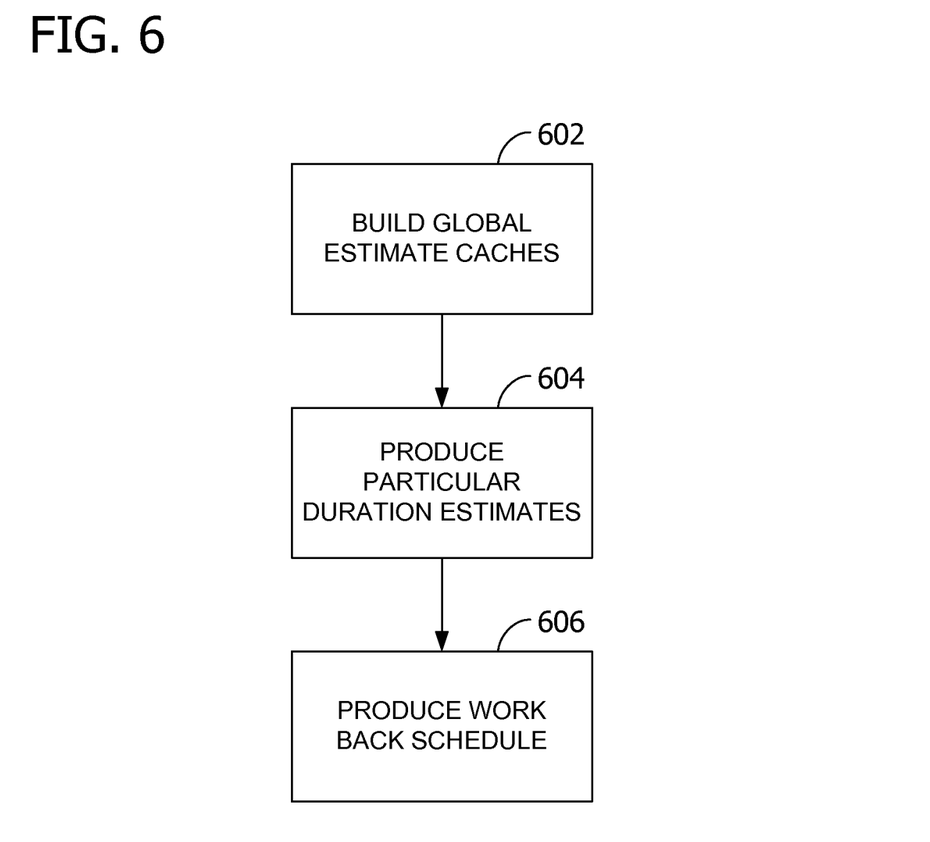
FIG. 6 is an exemplary flow chart illustrating creation of a workback schedule by the content ingestion system.

Referring next to FIG. 6, an exemplary flow chart illustrates creation of a workback schedule by the content ingestion system 102. At 602, the content ingestion system 102 builds global estimate caches. The global estimates caches correspond to the historical transaction data 116 for the publishers 104, and include duration estimates for the tasks involved with processing content of the various media content types. The operation 602 may be performed responsive to, or prior to, receiving a content submission request from one of the publishers 104.

At 604, the content ingestion system 102 produces duration estimates for the tasks associated with the media content type associated with the received content submission request. Based on the duration estimates, the content ingestion system 102 produces a workback schedule at 606.

Each of the operations illustrated in FIG. 6 are next described with reference to FIG. 7, FIG. 8, and FIG. 9.

Figure 7:
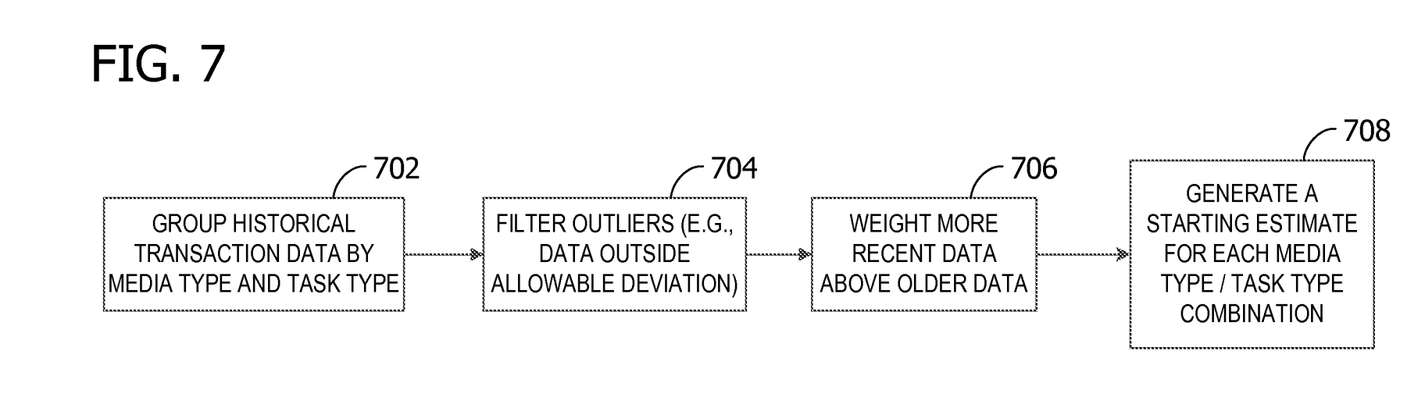
FIG. 7 is an exemplary flow chart illustrating calculation of duration estimates for tasks based on historical transaction data for all publishers.

Referring next to FIG. 7, an exemplary flow chart illustrates calculation of duration estimates for tasks based on historical transaction data 116 for a plurality of the publishers 104. The operations illustrated in FIG. 7 build the global estimate caches as described above with reference to FIG. 6.

At 702, the historical transaction data 116 is grouped by media content type and by task. At 704, the grouped historical transaction data 116 is filtered to remove outliers or other data outside an allowable deviation from the other data. The outliers may be determined statistically. For example, data outside one or two standard deviations may be removed.

At 706, recent historical transaction data 116 is weighted more heavily than older historical transaction data 116. For example, historical transaction data 116 that is more than one year old may be weighted less than historical transaction data 116 from two weeks ago. At 708, a starting duration estimate, or global estimate, is generated for each of the tasks for each of the media content types. Alternatively or in addition, the duration estimates are calculated responsive to receipt of a content submission request from one of the publishers 104.

Figure 8:
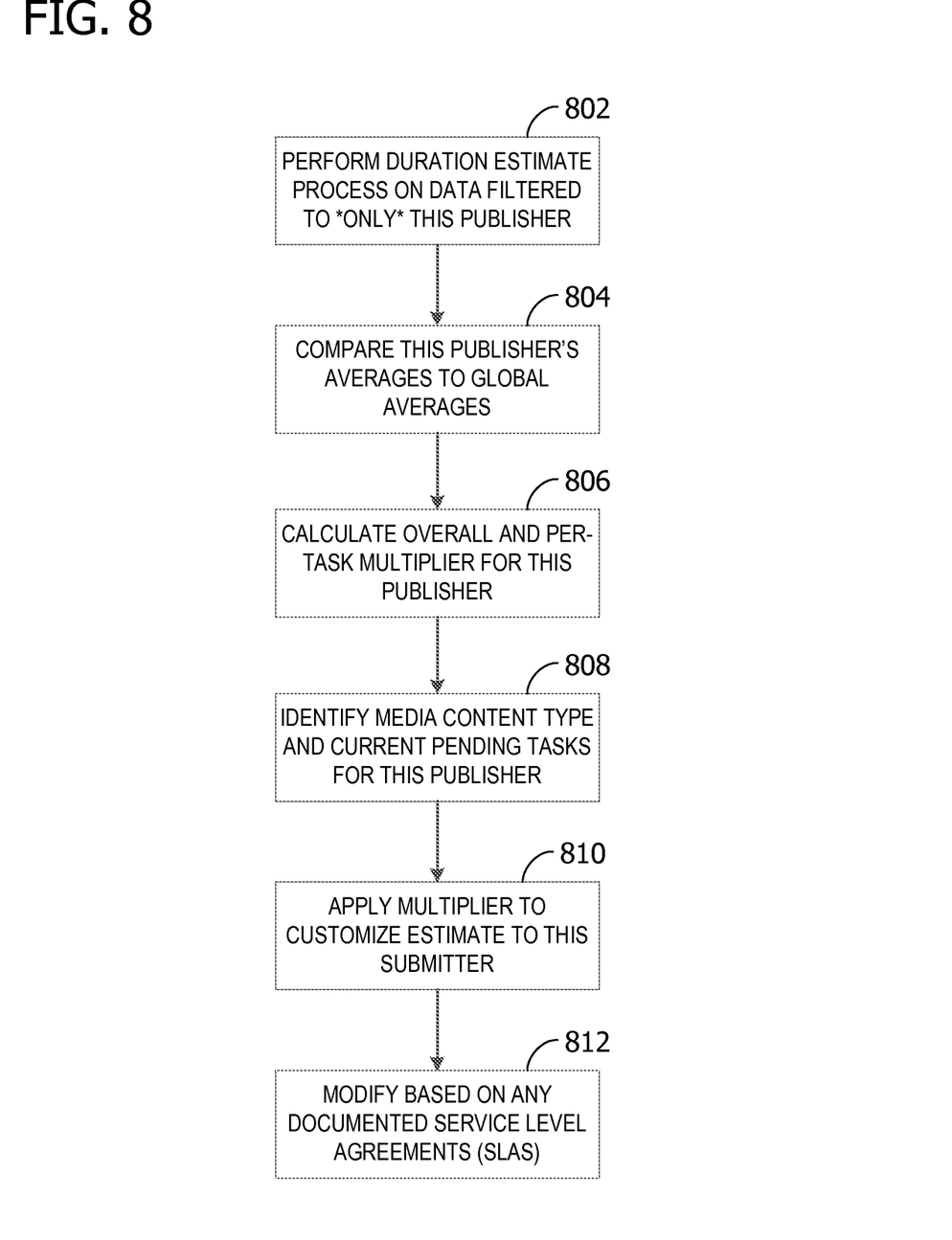
FIG. 8 is an exemplary flow chart illustrating calculation of task duration estimates for a particular publisher.

Referring next to FIG. 8, an exemplary flow chart illustrates calculation of task duration estimates for a particular publisher 104. The operations illustrated in FIG. 8 produce the particular duration estimates as described above with reference to FIG. 6.

The historical transaction data 116 is filtered to identify the data related to the publisher 104. The historical transaction data 116 may be filtered prior to, or in response to, receipt of a content submission request from the publisher 104. Duration estimates for the tasks involved with the content submission request are generated by performing a duration estimate process on the filtered data at 802. The duration estimates are compared to the global averages calculated for a plurality of the publishers 104 at 804. Based on the comparison, a multiplier is calculated at 806 to adjust one or more of the duration estimates. In some embodiments, an overall multiplier and a per-task multiplier are calculated for the publisher 104. For example, a multiplier of 1.0 indicates no modification. In general, the ratio between the duration estimate averages for the publisher 104 and the duration estimate averages for the publishers 104 as a group is defined and applied to the duration estimates.

The content submission request is analyzed to identify the media content type and corresponding tasks at 808. The multiplier is applied at 810 to customize the duration estimates for the publisher 104. At 812, the content ingestion system 102 further alters the customized duration estimates based on any SLAs applicable to the content submission request and/or publisher 104.

Figure 9:
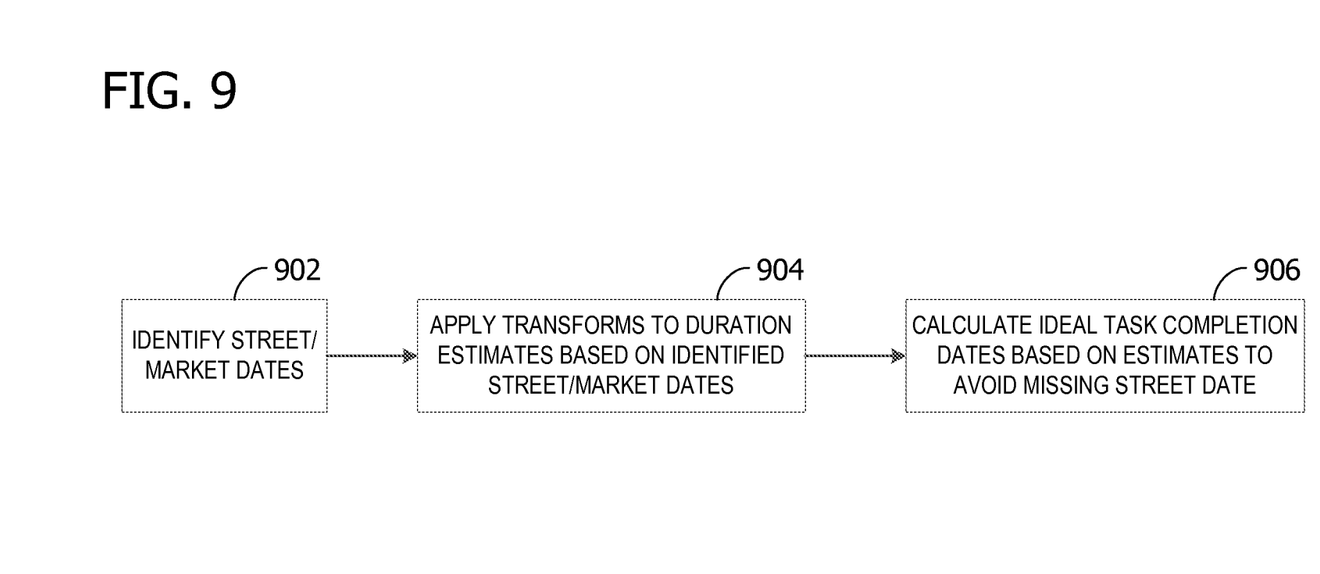
FIG. 9 is an exemplary flow chart illustrating generation of a workback schedule based on a target completion date for content ingestion.

Referring next to FIG. 9, an exemplary flow chart illustrates generation of a workback schedule based on a target completion date for content ingestion. The operations illustrated in FIG. 9 produce a workback schedule as described above with reference to FIG. 6.

The content ingestion system 102, or other entity receiving or accessing the content submission request, identifies the target completion date for processing the content. For example, at 902, the content ingestion system 102 identifies one or more street, market, or release dates for the content. For example, the content identified in a new content submission request may be related to content associated with a previously-submitted content submission request. The content ingestion system 102 may apply the target completion date from the previously-submitted content submission request to the new content submission request.

At 904, the content ingestion system 102 further transforms the duration estimates based on the identified street or market dates. For example, aspects of the disclosure decide when the tasks associated with the content submission request should be completed based on the release date identified by the publisher 104. Working back from the target completion date (e.g., accounting for weekends and holiday), the duration estimates are converted or transformed to start and end dates for the tasks. In an example in which a task has a duration estimate of ten business days and an anticipated release date of December 14, the content ingestions system 102 selects December 1 as the start date for the task in order for the task to be completed prior to or by the target completion date. In examples in which multiple tasks are transformed, task interdependencies are examined to determine whether particular tasks may be executed in parallel.

In another example, if the identified dates are far enough out, the content ingestion system 102 may increase the duration estimates (e.g., as a buffer) to ensure that each task can be completed.

At 906, the content ingestion system 102 calculates start dates for each of the tasks based on the duration estimates. The start dates are calculated to ensure that the identified street or market dates can be met. For example, the content ingestion system 102 may create an execution sequence for the tasks based on the workstream data 114 (e.g., task interdependencies), and identify which tasks may be executed or performed simultaneously (e.g., concurrently). Starting with the identified street or market date as the end date of the last task in the execution sequence, the content ingestion system 102 may work back through the execution sequence and calculate the start dates for the remaining tasks.

In some embodiments, the content ingestion system 102 provides the tasks, start dates, and end dates to the publisher 104.

Figure 10:
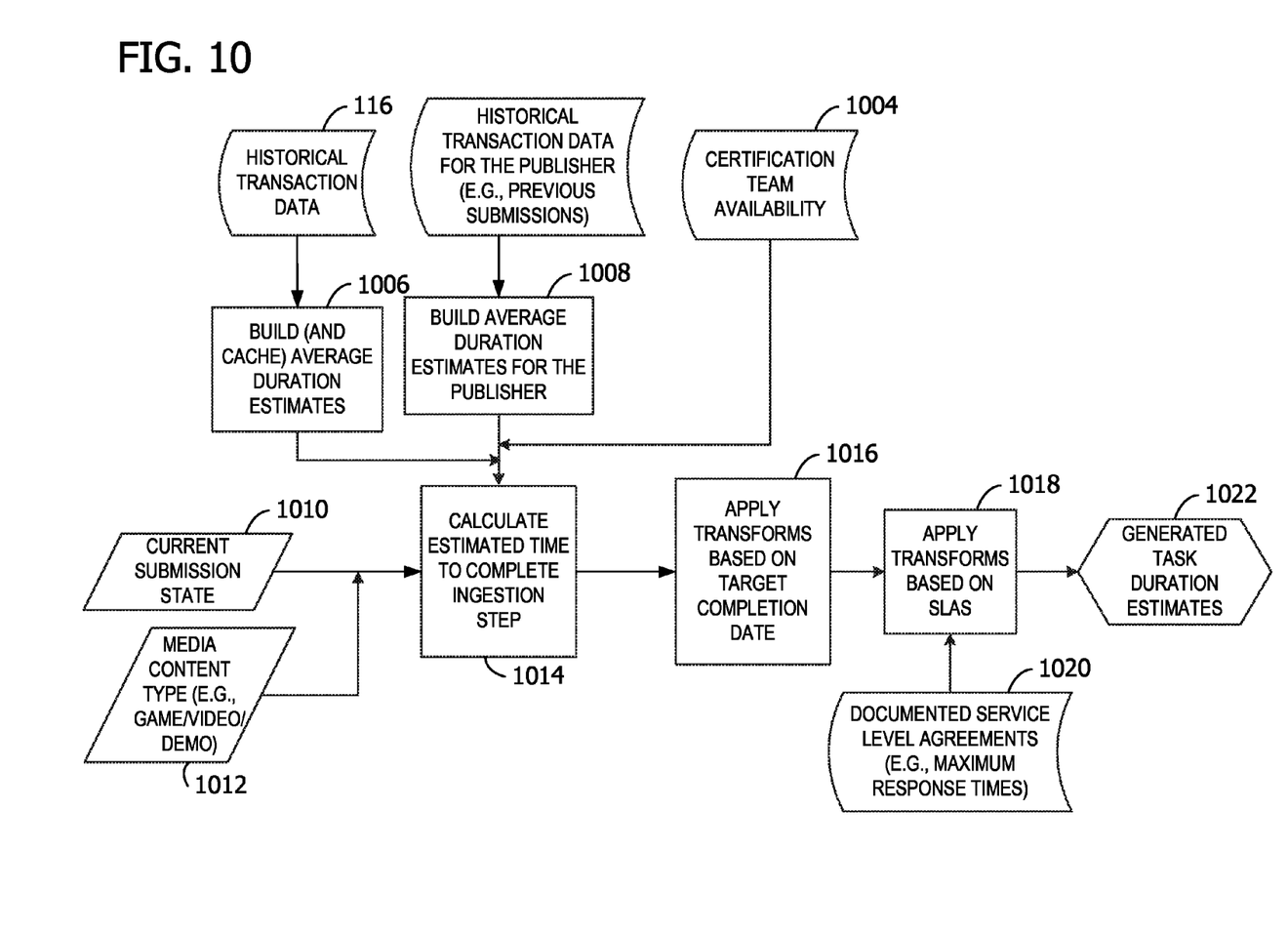
FIG. 10 is an exemplary flow chart illustrating generation of task duration estimates adjusted by service level agreements (SLAs).

Referring next to FIG. 10, an exemplary flow chart illustrates generation of task duration estimates adjusted by SLAs. The operations illustrated in FIG. 10 may be performed by an entity such as the content ingestion system 102.

The content ingestion system 102 calculates and caches the average duration estimates across a plurality of the publishers 104 at 1006 based on the historical transaction data 116 for the publishers 104. The content ingestion system 102 further calculates and caches the average duration estimates for the submitting publisher 104 at 1008 based on the historical transaction data 116 for the publisher 104 (e.g., previous submissions from the publisher 104).

The content ingestion system 102 accesses a current submission state (e.g., the state of tasks associated with the current content submission request) at 1010. In the example of FIG. 10, the content ingestion system 102 identifies the media content type at 1012 separate from the content submission request. Given the calculated duration estimates and knowledge of availability of a certification team (e.g., for completion of some of the tasks) at 1004, the content ingestion system 102 calculates the estimated time to ingest or otherwise process the content associated with the content submission request at 1014.

The content ingestion system 102 applies transforms to the estimated times at 1016 based on the target completion date for the content submission, such as illustrated and described with reference to FIG. 9. The content ingestion system 102 further applies transforms to the estimated times at 1018 based on documented SLAs 1020. The documented SLAs 1020 represent, for example, maximum response times.

At 1022, the content ingestion system 102 provides the generated task duration estimates to the publisher 104. The content ingestion system 102 may also provide start and/or end dates, a calendar, Gantt chart, or any other data representing or derived from the duration estimates for the tasks.

Additional Examples

In some embodiments, after the content has been processed (e.g., a product has been released), aspects of the disclosure present information on purchase offers received or configured for the released product. The purchase offers are presented to the publisher 104 or other entity with corresponding start and end dates for each of the purchase offers. For example, the start and end dates for the purchase offers may be displayed in a Gantt chart overlaid on a calendar.

In an exemplary scenario, the content ingestion system 102 may dynamically adjust the duration estimates as one or more of the tasks are completed based on the actual durations for the completed tasks. For example, if the publisher 104 is completing tasks ahead of schedule, the content ingestion system 102 may reduce the duration estimates for the remaining tasks. Further, revised start and/or end dates for one or more of the tasks may be calculated, and provided to the publisher 104 (e.g., on a calendar).

At least a portion of the functionality of the various elements in FIG. 1 and FIG. 2 may be performed by other elements in FIG. 1 and/or FIG. 2 or an entity (e.g., processor, web service, server, application program, computing device, etc.) not shown in FIG. 1 or FIG. 2.

In some embodiments, the operations illustrated in the figures may be implemented as software instructions encoded on a computer readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users. In such embodiments, notice is provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, exclude propagated data signals, and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for producing a schedule for media content ingestion by the content ingestion system.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for producing a schedule for media content ingestion, said system comprising:
   a memory area associated with a content ingestion system, said memory area storing workstream data identifying a plurality of media content types each having a plurality of tasks associated therewith, said memory area further storing historical transaction data associated with a plurality of publishers; and
   a processor programmed to:
      receive a content submission request from a publisher, said content submission request identifying at least one of the plurality of media content types in the workstream data stored in the memory area, said content submission request further identifying a target completion date;
      calculate, based on previous content submissions from the publisher, a duration estimate for each of the plurality of tasks associated with the media content type in the received content submission request;
      adjust the calculated duration estimates for the plurality of tasks based on the historical transaction data stored in the memory area, wherein the processor is programmed to adjust the calculated duration estimates at least by weighting the calculated duration estimates based on a global average of the historical transaction data;
      determine a first start date and a first end date for each of the plurality of tasks based at least on the adjusted duration estimates and the target completion date;
      determine a second start date and a second end date for each of the plurality of tasks based on a service level agreement associated with the publisher; and
      present the plurality of tasks associated with the media content type in the received content submission request, the determined start dates, and the determined end dates to the publisher.

2. The system of claim 1, wherein the processor is programmed to present the plurality of tasks by presenting a calendar to the publisher, said calendar showing the plurality of tasks along with the determined start dates and the determined end dates.

3. The system of claim 1, wherein the processor is programmed to present the plurality of tasks by presenting, to the publisher, the plurality of tasks in a Gantt chart overlaid on a calendar.

4. The system of claim 1, wherein the processor is further programmed to notify the publisher of an error state if the target completion date is not achievable relative to the determined start dates and/or the determined end dates.

5. The system of claim 4, wherein the processor is further programmed to color-code at least one of the determined start dates and/or determined end dates based on the error state.

6. The system of claim 1, wherein the memory area further stores the previous content submissions from the publisher.

7. The system of claim 1, where the content submission request received by the processor represents a request for the content ingestion system to receive one or more of the following: a movie, a game, and an application.

8. The system of claim 1, wherein the processor is further programmed to make media content included in the content submission request accessible to a user computing device based on the determined second start date and the determined second end date while meeting the service level agreement.

9. The system of claim 1, wherein the processor is further configured to dynamically adjust the determined start and end dates based on completion of at least one of the tasks.

10. A method comprising:
    receiving, by a content ingestion system, a content submission request from a publisher, said content submission request identifying a media content type, said media content type having a plurality of tasks associated therewith;
    generating, based on previous content submissions from the publisher, a duration estimate for each of the plurality of tasks associated with the media content type in the received content submission request;
    adjusting the generated duration estimates for each of the plurality of tasks based on historical transaction data associated with a plurality of publishers, wherein adjusting the generated duration estimates comprises weighting the generated duration estimates based on a global average of the historical transaction data;
    altering the adjusted duration estimates for each of the plurality of tasks based on a service level agreement, wherein the altered duration estimates for each of the plurality of tasks enable meeting one or more contractual obligations associated with the publisher; and
    providing, by the content ingestion system to the publisher, the altered duration estimates for each of the plurality of tasks.

11. The method of claim 10, further comprising:
    identifying a target completion date associated with the content submission request; and
    generating a workback schedule based on the adjusted duration estimates and the identified target completion date.

12. The method of claim 11, wherein generating the workback schedule comprises identifying a due date for each of the plurality of tasks.

13. The method of claim 10, further comprising generating the historical transaction data for the media content type based on content submissions from the plurality of publishers, the historical transaction data including duration estimates for each of a plurality of media content types and a plurality of task types.

14. The method of claim 10, further comprising updating the historical transaction data for the media content type based on a content submission associated with the received content submission request.

15. The method of claim 10, wherein receiving the content submission request comprises receiving a content submission request for one or more of the following: a mobile device application, a video game, and a movie trailer.

16. One or more computer storage media embodying computer-executable components, said components comprising:
- a communications interface component that when executed causes at least one processor to receive a content submission request from a publisher, said content submission request identifying a media content type, said media content type having a plurality of tasks associated therewith;
- a transaction component that when executed causes at least one processor to generate, based on previous content submissions from the publisher and on historical transaction data associated with a plurality of publishers, a duration estimate for each of the plurality of tasks associated with the media content type in the content submission request received by the communications interface component, wherein the generated duration estimates are weighted based on a global average of the historical transaction data, wherein the transaction component further causes the processor to alter the generated duration estimate for each of the plurality of tasks based on a service level agreement, the altered duration estimates for each of the plurality of tasks enabling meeting one or more contractual obligations associated with the publisher; and
- a presentation component that when executed causes at least one processor to identify start and end dates on a calendar based on the altered duration estimates for each of the plurality of tasks.

17. The computer storage media of claim 16, wherein the transaction component further identifies workstream data defining the plurality of tasks associated with the media content type, said workstream data further identifying workstream dependencies among the plurality of tasks.

18. The computer storage media of claim 16, wherein the workstream dependencies represent one or more of the following: product-to-product dependencies, workflow-to-workflow dependencies, and state dependencies.

19. The computer storage media of claim 16, wherein the presentation component further identifies dates for purchase offers related to content associated with the content submission request.

* * * * *